(12) United States Patent
Mehrvar

(10) Patent No.: US 9,794,656 B2
(45) Date of Patent: Oct. 17, 2017

(54) MODULAR PHOTONIC SWITCH ARCHITECTURE

(71) Applicant: Hamid Mehrvar, Ottawa (CA)

(72) Inventor: Hamid Mehrvar, Ottawa (CA)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/202,182

(22) Filed: Jul. 5, 2016

(65) Prior Publication Data

US 2017/0171646 A1 Jun. 15, 2017

Related U.S. Application Data

(60) Provisional application No. 62/266,328, filed on Dec. 11, 2015.

(51) Int. Cl.
| | | |
|---|---|---|
| H04B 10/2575 | (2013.01) | |
| H04J 14/02 | (2006.01) | |
| G02F 1/313 | (2006.01) | |
| H04Q 11/00 | (2006.01) | |
| G02B 6/27 | (2006.01) | |
| G02B 6/35 | (2006.01) | |
| G02F 1/31 | (2006.01) | |

(52) U.S. Cl.
CPC ....... *H04Q 11/0005* (2013.01); *G02B 6/2766* (2013.01); *G02B 6/2773* (2013.01); *G02B 6/3546* (2013.01); *G02F 1/313* (2013.01); *H04B 10/2575* (2013.01); *H04J 14/0201* (2013.01); *G02F 2001/311* (2013.01); *H04Q 2011/0016* (2013.01); *H04Q 2011/0049* (2013.01); *H04Q 2011/0058* (2013.01)

(58) Field of Classification Search
CPC .............. H04B 10/2575; G02B 6/2766; G02B 6/2773; G02B 6/3546; G02F 1/313; G02F 2001/0016; H04Q 11/0005; H04Q 2011/0016; H04Q 2011/0049; H04Q 2011/0058
USPC .......................................................... 398/45
See application file for complete search history.

(56) References Cited

U.S. PATENT DOCUMENTS

| | | | | |
|---|---|---|---|---|
| 5,018,129 A | * | 5/1991 | Netravali | ................. H04Q 3/68 370/388 |
| 5,535,373 A | * | 7/1996 | Olnowich | ......... G06F 15/17375 370/466 |
| 5,864,552 A | * | 1/1999 | Du | ..................... H04Q 11/0478 370/386 |
| 8,089,959 B2 | | 1/2012 | Szymanski | |

(Continued)

FOREIGN PATENT DOCUMENTS

| | | |
|---|---|---|
| CN | 1370286 A | 9/2002 |
| WO | 101216603 A | 7/2008 |
| WO | 2014078940 A1 | 5/2014 |

OTHER PUBLICATIONS

International Search Report of PCT/CN2016/101591 dated Dec. 28, 2016.

*Primary Examiner* — Dalzid Singh
(74) *Attorney, Agent, or Firm* — Gowling WLG (Canada) LLP

(57) ABSTRACT

Completed modular optical switch architecture comprises a number of modular components. The components can be combined in various manners in order to provide different sized switches with different characteristics to meet particular requirements.

26 Claims, 15 Drawing Sheets

(56) References Cited

U.S. PATENT DOCUMENTS

2003/0091271 A1* 5/2003 Dragone .......... H04Q 11/0005
385/20
2014/0328154 A1 11/2014 Mehrvar et al.
2016/0047991 A1 2/2016 Mehrvar

* cited by examiner

MODULAR PHOTONIC SWITCH ARCHITECTURE

CROSS REFERENCE TO RELATED APPLICATIONS

This application claims the benefit of priority to U.S. Provisional Patent Application Ser. No. 62/266,328 filed on Dec. 11, 2015 and entitled "MODULAR SCALABLE PHOTONIC SWITCH ARCHITECTURE", the contents of which are incorporated herein by reference.

TECHNICAL FIELD

The current disclosure relates to photonic switches and in particular to a modular scalable architecture for photonic switches.

BACKGROUND

Optical networks are employed in a wide variety of environments from data centers to transit or backbone networks as well as backhaul and Radio over Fiber (RoF) applications. To connect different nodes in an optical network, switches are employed. Photonic switches allow the switching of incoming optical signals from input ports to output ports without requiring a conversion of the signal, from an optical signal to an electrical signal and then back to an optical signal (OEO). Avoiding OEO conversions obviates the need for conversions to and from the electrical domain, which can allow for the design of faster switches. Design of a photonic switch may involve trade-offs among a number of factors such as capacity, blocking probability, synchronous or asynchronous operation, cell count, optical loss, crosstalk etc. Photonic switches may be designed to suit particular requirements of different applications. It would be desirable to have a modular photonic switch architecture that may be used for different switch sizes and applications.

SUMMARY

In accordance with the present disclosure there is provided a photonic switch comprising: a switching core consisting of first and second switching planes each comprising at least one 16×16 blocking switch component comprising 4 input blocks optically coupled to 4 output blocks, each of the 4 input blocks and the 4 output blocks comprising 2 input 2×2 switching cells optically coupled to 2 output 2×2 switching cells; a plurality of input modules, each input module comprising one or more switch inputs optically coupled to each one of the first and second switching planes of the switching core; and a plurality of output modules, each output module comprising one or more switch outputs optically coupled to each one of the first and second switching planes of the switching core.

In a further embodiment of the photonic switch, the photonic switch is a 16×16 non-blocking photonic switch wherein each one of the first and second switching planes is provided by the 16×16 blocking switch component, the photonic switch comprising: 16 input modules, each comprising a single switch input optically coupled to each one of the first and second switching planes; and 16 output modules, each comprising a single switch output optically coupled to each one of the first and second switching planes. In a further embodiment of the photonic switch, the photonic switch can be a 32×32 non-blocking photonic switch, wherein each one of the first and second switching planes is a 32×32 blocking switch component comprising: a pair of 16×16 blocking switch components; 16 2×2 fan-in switches optically coupling two switching plane inputs to each one of the pair of 16×16 blocking switch components; and 16 2×2 fan-out switches optically coupling two switching plane outputs to each one of the pair of 16×16 blocking switch components; and wherein the photonic switch comprises: 32 input modules, each comprising a single switch input optically coupled to each one of the first and second switching planes; and 32 output modules, each comprising a single switch output optically coupled to each one of the first and second switching planes. In a further embodiment of the photonic switch, the photonic switch is incorporated into an optical add/drop multiplexor. In a further embodiment of the photonic switch, each of the input modules comprises a polarizing beam splitter and rotator for splitting an input into two polarization components, the first polarization component switched through the first switching plane and the second polarization component switched through the second switching plane, and each of the output modules comprises a polarizing beam rotator and combiner for recombining optical signals from the first switching plane and the second switching plane. In a further embodiment of the photonic switch, one or more of the 2×2 switching cells are based on Mach-Zehnder interferometers (MZIs) or micro-ring structures. In a further embodiment, the photonic switch further comprises a controller for determining and generating control signals in order to establish requested optical paths between the switch inputs and switch outputs. In a further embodiment of the photonic switch, the controller is capable of routing one optical signal per switching cell or two optical signals per switching cell in either a synchronous mode or asynchronous mode. In a further embodiment of the photonic switch, the switch is an N×N switch and each one of the first and second switching planes comprise an N×N blocking switch component comprising $2^k$ 16×16 blocking switch components, where: $N \geq 64$; and $k=(N/16)-1$. In a further embodiment of the photonic switch, the switch is an N×N switch and each one of the first and second switching planes comprise an N×N blocking switch component comprising $2^k$ 16×16 blocking switch components, where: each of the 2 k 16×16 blocking switch component are operated so each of the 2×2 switching cells switches a single signal at a time; $N \geq 64$; and $k=N/16$ In accordance with the present disclosure there is further provided an N×N photonic switch comprising: a switching core comprising M switching planes each comprising at least one 16×16 blocking switch component comprising 4 input blocks optically coupled to 4 output blocks, each of the 4 input blocks and the 4 output blocks comprising 2 input 2×2 switching cells optically coupled to 2 output 2×2 switching cells; $P_{in}$ input modules, each input module comprising one or more switch inputs optically coupled to each one of the M switching planes of the switching core; and $P_{out}$ output modules, each output module comprising one or more switch outputs optically coupled to each one of the M switching planes of the switching core, where: $M>4$; $N \geq 16$; $P_{in} \geq 4$; and $P_{out} \geq 4$. In a further embodiment of the N×N photonic switch, the photonic switch is a 32×32 photonic switch comprising 8 switching planes, each of the switching planes comprising a single 16×16 blocking switch component. In a further embodiment, the N×N photonic switch comprises 8 input modules, each for reconfigurably establishing light paths from 4 switch inputs to each of the 8 switching planes through 12 2×2 switching cells; and 8 output modules, each for reconfigurably establishing light paths from 4 switch outputs to each of the 8 switching planes through 12 2×2 switching cells. In a further embodiment, the N×N photonic switch comprises 16 input modules, each for reconfigurably establishing light paths from 2 switch inputs to each of the 8 switching planes through 8 2×2 switching cells; and 16 output modules, each for reconfigurably establishing light paths from 2 switch outputs to each of the 8 switching planes through 8 2×2 switching cells. In a further embodiment of the N×N photonic switch, the photonic switch is a 64×64 photonic switch comprising: 8 switching planes; 16 input modules, each comprising 4 switch inputs reconfigurably connected to each of the 8 switching planes through 12 2×2 switching cells; and 16 output modules, each comprising 4 switch outputs reconfigurably connected to each of the 8 switching planes through 12 2×2 switching cells. In a further embodiment of the N×N photonic switch, each of the switching planes is a 32×32 blocking switch comprising: a pair of 16×16 switches; 16 2×2 fan-in switches reconfigurably connecting 2 switching plane inputs to each one of the pair of 16×16 switches; and 16 2×2 fan-out switches reconfigurably connecting 2 switching plane outputs to each one of the pair of 16×16 switches. In a further embodiment of the N×N photonic switch, the photonic switch is a 64×64 photonic switch comprising: 8 switching planes; 32 input modules, each comprising 2 switch inputs reconfigurably connected to each of the 8 switching planes through 8 2×2 switching cells; and 32 output modules, each comprising 2 switch outputs reconfigurably connected to each of the 8 switching planes through 8 2×2 switching cells. In a further embodiment of the N×N photonic switch, each of the switching planes is a 64×64 blocking switch components comprising 4 planes of 16×16 switches, 16 4×4 input switches and 16 4×4 output switches. In a further embodiment of the N×N photonic switch, one or more of the 2×2 switching cells are based on Mach-Zehnder interferometers (MZIs) or micro-ring structures. In a further embodiment, the N×N photonic switch further comprises a controller for determining and generating control signals in order to establish requested connections between the switch inputs and switch outputs. In a further embodiment of the N×N photonic switch, the controller is capable of routing one optical signal per switching cell or two optical signals per switching cell in either a synchronous mode or asynchronous mode.

In accordance with the present disclosure there is provided a further N×N photonic switch comprising: a switching core comprising 4 switching planes each comprising at least 4 16×16 blocking switch components, 16 4×4 input switches and 16 4×4 output switches, each of the at least 4 16×16 blocking switch components comprising 4 input blocks optically coupled to 4 output blocks, each of the 4 input blocks and the 4 output blocks comprising 2 input 2×2 switching cells optically coupled to 2 output 2×2 switching cells; $P_{in}$ input modules, each input module comprising one or more switch inputs optically coupled to each one of the 4 switching planes of the switching core; and $P_{out}$ output modules, each output module comprising one or more switch outputs optically coupled to each one of the 4 switching planes of the switching core, where: $N \geq 32$; $P_{in} \geq 4$; and $P_{out} \geq 4$.

In a further embodiment of the further N×N photonic switch, each of the switching planes is a 64×64 blocking switch components comprising 4 planes of 16×16 switches, 16 4×4 input switches and 16 4×4 output switches. In a further embodiment of the further N×N photonic switch, one or more of the 2×2 switching cells are based on Mach-Zehnder interferometers (MZIs) or micro-ring structures. In a further embodiment, the further N×N photonic switch further comprises a controller for determining and generating control signals in order to establish requested connections between the switch inputs and switch outputs. In a further embodiment of the further N×N photonic switch, the controller is capable of routing one optical signal per switching cell or two optical signals per switching cell in either a synchronous mode or asynchronous mode.

BRIEF DESCRIPTION OF THE DRAWINGS

Embodiments are described herein with references to the appended drawings, in which.

DETAILED DESCRIPTION

Photonic switches are used in a wide variety of applications. The particular application of a photonic switch dictates a required switch size as well as other characteristics, such as an amount of crosstalk, a probability of one or more connection requests being blocked, a number of switching cells required to implement the switch, insertion loss associated with the switch, etc. The switch architecture described further below allows the switch design to be easily adjusted in order to meet the requirements of a particular application. The modular switch architecture described below may be used in a wide variety of applications, such as in data center switches of varying sizes such as 16×16, 32×32, 64×64 as well as larger and smaller sizes, reconfigurable optical add/drop multiplexers (ROADMs) for optical networks, dual polarization switches as well as other applications.

Figure 1:
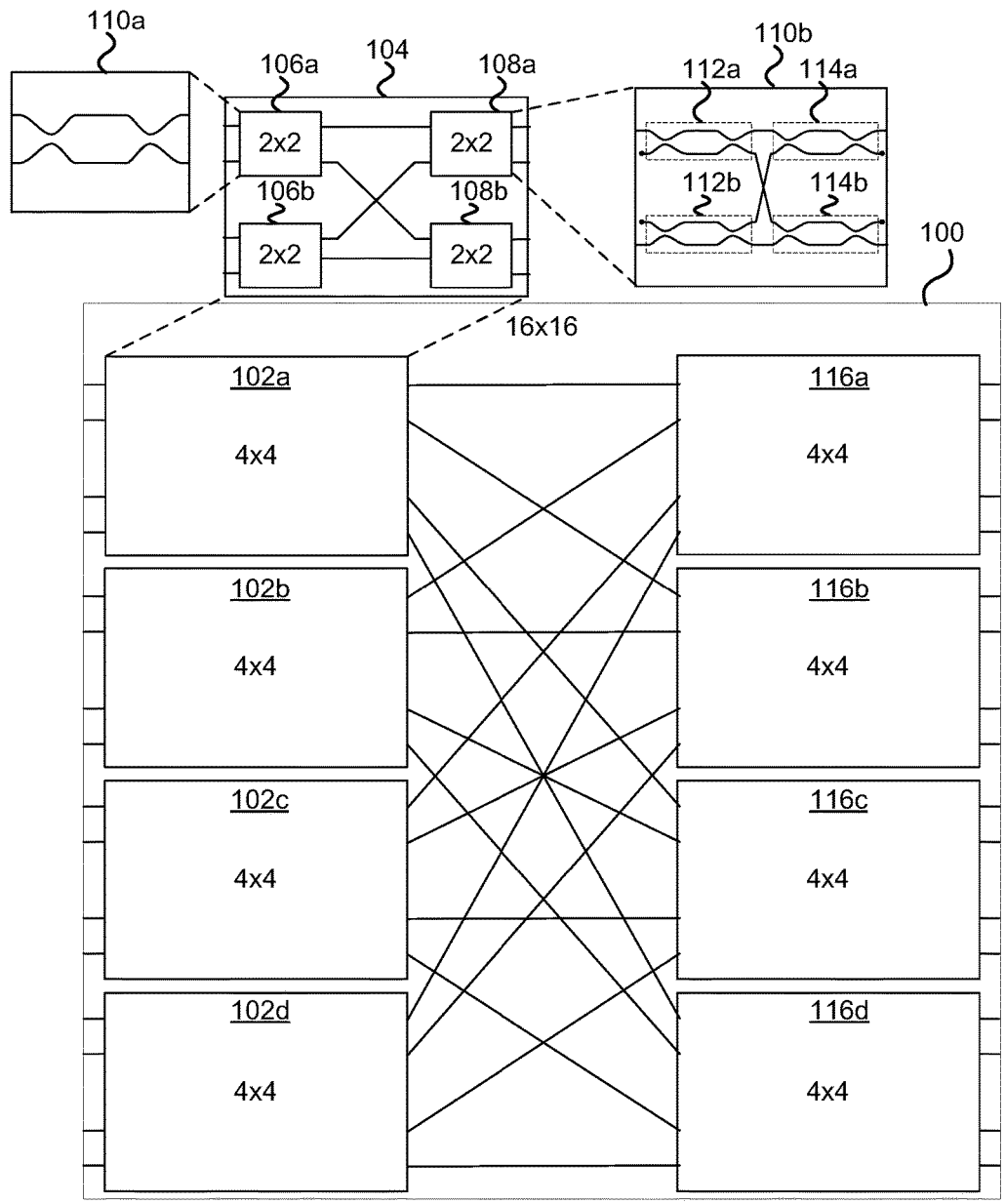
FIG. 1 depicts building block components for a modular scalable switch architecture.

FIG. 1 depicts building block components for a modular scalable switch architecture. A 16×16 switch component 100 is depicted that comprises 16 inputs and 16 outputs. The 16×16 switch component 100 is a blocking 16×16 switch. The 16×16 switch component 100 may be used as a building block for different photonic switches. The 16×16 switch component comprises 4 input blocks 102a-102d (referred to collectively as input blocks 102) and 4 output blocks 116a-116d (referred to collectively as output blocks 116). Each of the input blocks 102 is a 4×4 switch having 4 inputs that are optically connected to each one of 4 output blocks 116 to allow optical paths to be reconfigurably established through the input blocks. Similarly, each of the output blocks 116 is a 4×4 having 4 outputs that are optically connected to each of the 4 input blocks 116 to allow optical paths to be reconfigurably established through the output blocks 116. The 4×4 input blocks 102 and the 4×4 output blocks 116 provide the blocking 16×16 switch component that is a building block for building various photonic switches.

The input blocks 102 and output blocks 116 may have the same 4×4 switch structure 104. The 4×4 switch structure 104 may be built from 4 2×2 switching cells 106a, 106b, 108a, 108b. Two of the switching cells 106a, 106b provide the inputs of the 4×4 switch structure 104 and two of the switching cells 108a, 108b provide the outputs of the 4×4 switch structure 104. Each of the 2×2 switching cells 106a, 106b, 108a, 108b may be based on, for example Mach Zehnder Interferometers depicted as switching cell structure 110a, micro ring structures or other switching structures. Further, a number of the switching cells may be built of a plurality of individual switching cell structures. For example, the 2×2 switching cell structure 110b may be based on Mach-Zehnder Interferometer (MZI) components. The 2×2 switching cell structure 110b comprises a number of MZI structures that allow two inputs to be connected to two outputs in either a bar configuration or a cross configuration. As depicted, the 2×2 switching cell structure 110b comprises 4 MZI structures 112a, 112b, 114a, 114b that provide required switching of the two inputs to the two outputs. The 2×2 switching cell structure 110b that comprises four MZI switching cells may be used to reduce the crosstalk between signals. The switching cell structure 110b may be used for each of the switching cells in the switch; although doing so may increase the number of individual MZI structures used in the switch. Alternatively, the crosstalk reduce switching cell structure 110b may be used in only a subset of the switching cells. For example a center column of crosstalk reducing switching cells 110b may be used in a switch. Although described as being provided by MZI structures, the 2×2 switching cells may be provided by other techniques. For example, the 2×2 switching cell structure may be provided by two micro-ring structures.

The 16×16 switch component 100 provides a building block that can be used in creating numerous switches of different sizes. The 16×16 switch component 100 comprises input blocks optically connected to output blocks to allow reconfigurable optical paths to be established. Both the input blocks 102 and output blocks 116 each comprise input 2×2 switching cells 106a, 106b and output 2×2 switching cells 108a, 108b. Accordingly, the 16×16 switch component 100 comprises 4 columns of 2×2 switching cells. The width of the 16×16 switching component 100, as well as an overall width of a photonic switch, may be based on the number of columns in the switching component. Each of the switching cells in a photonic switch has an associated optical loss and as such, the fewer columns of switching cells in the switch component 100, the lower the optical loss of the switch component 100. That is, for narrower photonic switches an optical path established through the switch may pass through fewer switching cells and as such experience less insertion loss as compared to a wider photonic switch. As described further below, the 16×16 switch component 100 may be used as a building block of a narrow-width photonic switch. As the switch size increases, the switch design may increase in height, by adding additional 16×16 switch blocks vertically, rather than increasing the width (i.e. adding switching blocks horizontally). Although the height preferentially increases as the switch size increases, it may also be necessary to increase the width of the switch in order to distribute signals to the additional vertical 16×16 switch components 100. By increasing a height of the switch instead of increasing the width, where possible, insertion loss is reduced as an optical signal will pass through fewer columns of optical components. Additionally, when the height to width aspect ratio of a switch is increased, there will be an increase in the number of waveguide crossings that are located between an input section and middle section of the switch, along with a corresponding increase in the number of waveguide crossings between the middle section of the switch and an output section. In wider switch designs, the location of the waveguide crossings is typically not concentrated in particular regions. Waveguide crossings may have undesirable effects, such as an increase in crosstalk, but there are known techniques to reduce these effects. The waveguide crossing may be reduced by using a Nitride layer, allowing some of the waveguide connectivity to be routed in the same plane as the switching elements and the remainder of the waveguide connectivity to pass to the Nitride layer to minimize the crossings and then return down to the switching element plane. Such routing reduces the number of waveguide crossings and may result in less insertion loss. It will be understood by those skilled in the art that by concentrating the waveguide crossings in the two aforementioned areas between the input section and middle section and the middle section and output section, it may make the use of these techniques more feasible than it would have been if the crossings were evenly spread across the entire switch.

Figure 2:
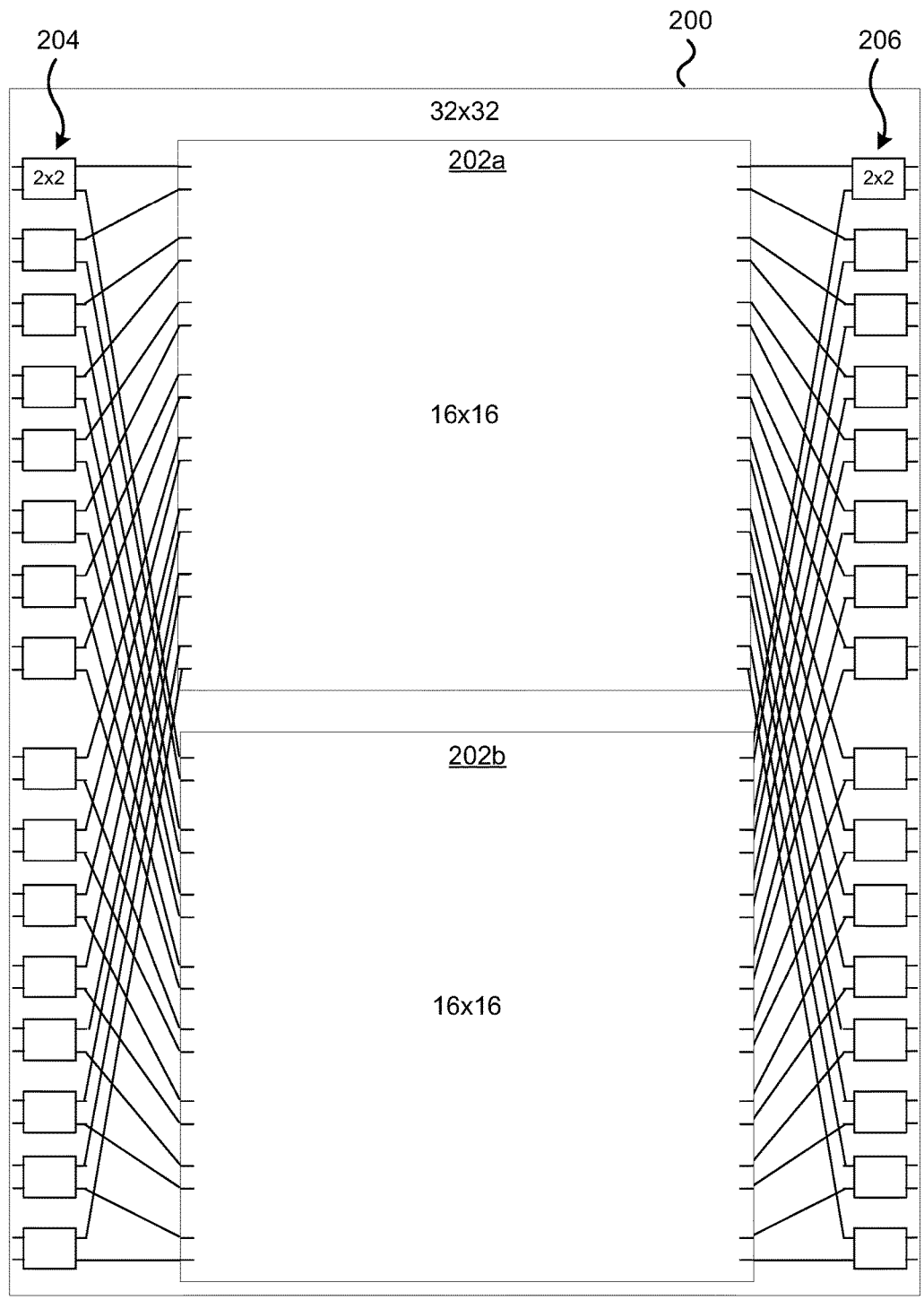
FIG. 2 depicts a further building block component for a modular scalable switch architecture.
Figure 5:
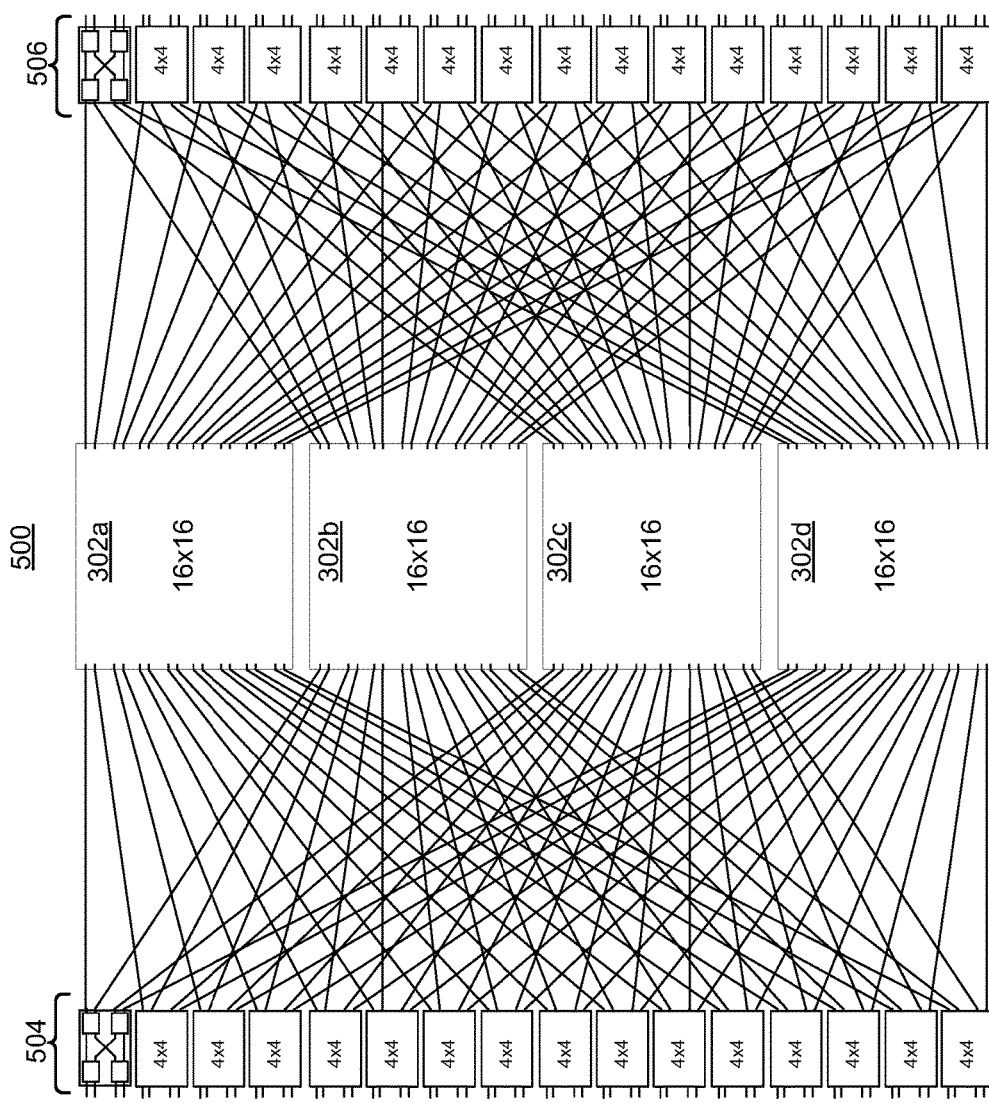
FIG. 5 depicts a further illustrative 32×32 photonic switch built from modular components.

FIG. 2 depicts a further building block component for a modular scalable switch architecture. The 16×16 switch component 100 may be used as a building block to build a blocking 32×32 switch component 200. The 32×32 switch component 200 is a 32×32 blocking switch comprising a pair of 16×16 switch components 202a, 202b (referred to collectively as 16×16 switch components 202). Each of the 16×16 switch components 202 are vertically aligned with each other such that the columns of 2×2 switches of each 16×16 switch component are aligned. In addition to the 16×16 switch components 202, the larger 32×32 switch component 200 comprises 16 component input switches 204. Each of the component input switches 204 is a 2×2 switch cell, which may be provided by a switch cell such as 110a or switch cell 110b. Each of the component input switches 204 comprises 2 inputs that are optically connected to each 16×16 switch component of the 16×16 switch components 202 to allow optical paths to be reconfigurably established to each of the 16×16 switch components 202. In addition to the 16 component input switches, the 32×32 switch component 200 further comprises 16 component output switches 206. Each of the output switches 206 comprises 2 outputs that are optically connected to each of the 16×16 switch components 202. The 32×32 switch structure 200 built from the 16×16 switch components 202 may be used as a building block of various different switches. Further, as depicted in FIG. 5, a 64×64 switch may be constructed in a similar manner, having four vertically aligned 16×16 switch components, 16 input switches and 16 output switches, with each of the input and output switches comprising a 4×4 building block switch structure. It will be appreciated that the same modular architecture can be used to create even larger components such as 128×128 switch components, 256×256 switch components, or larger.

As described above, the switch components structures 100, 200 may be used as building blocks for a photonic switch. The photonic switches that may be built from the switch components structures 100, 200, which in turn may be built from 16×16 blocking switch components. The switch component structures 100, 200 may comprise an input section having a number of input modules each for connecting one or more optical inputs to a switching core. The switching core is provided as a middle section of the photonic switch that may comprise a plurality of the switch component structures 100, 200. The photonic switch may further comprise an output section having a number of output modules, each for connecting one or more optical outputs to the switching core. Various switches may be built by combining different input sections, middle sections and output sections. Typically, the input sections are mirrored by the output sections. For example, an input section may comprise 16 input modules, each comprising a 2×4 switch for reconfigurably establishing light paths between the 2 inputs to each one of 4 16×16 switch component structures 100 and a corresponding output section may comprise 16 output modules, each comprising a 4×2 switch for reconfigurably establishing light paths between each of the 4 16×16 switch component structures 100 and the 2 outputs. As described further with regard to FIGS. 3-10, by varying the input modules of the input section, the output modules of the output section as well as the configuration of the middle section, different switches may be provided.

Figure 3:
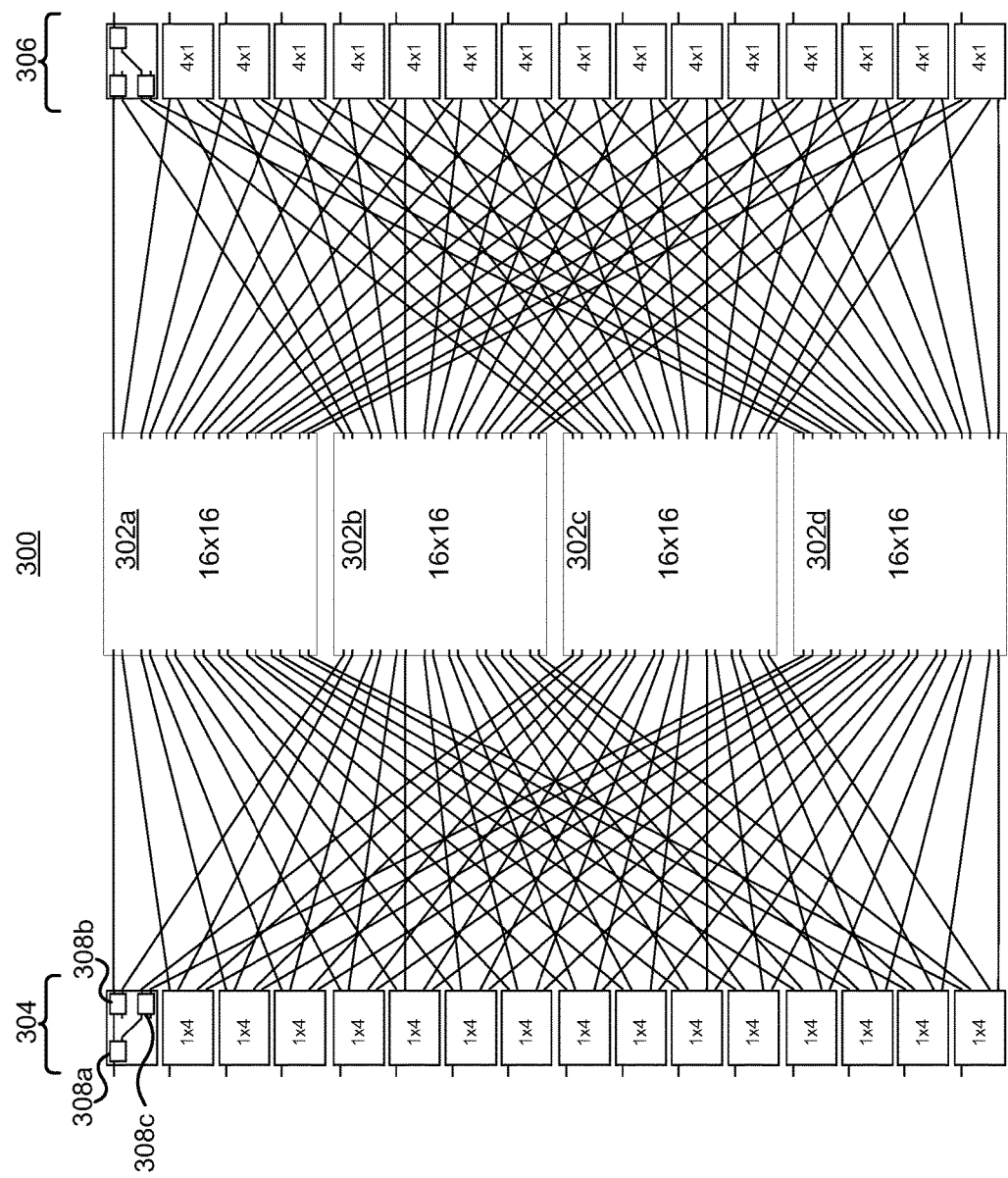
FIG. 3 depicts an illustrative 16×16 photonic switch built from modular components.

FIG. 3 depicts an illustrative 16×16 photonic switch built from modular components. The photonic switch 300 is a 16×16 non-blocking switch. The photonic switch 300 comprises a switching core of 4 planes of 16×16 blocking switch components 302a, 302b, 302c, 302d (referred to collectively as 16×16 switch components 302) connected between an input section 304 and an output section 306. Each of the 16×16 switch components 302 may be provided by a 16×16 blocking switch component 100 as described above with reference to FIG. 1. The input section 304 comprises 16 input modules. Each of the input modules have the same structure and are provided by 3 switching cells 308a, 308b, 308c that allow a light path to be reconfigurably established from a switch input to each one of the 4 switching planes. Each of the switching cells 308a, 308b, 308c may be provided by a switching cell 110a as described with regard to FIG. 1. Each of the input modules provides a 1×4 switch and as such, the photonic switch comprises 16 switch inputs. The output section 306 is similar to the input section 304 and comprises 16 output modules. Each of the output modules provides a 4×1 switch reconfigurably establish light paths from each of the switching planes to a switch output. As with the input modules, each of the output modules comprises 3 switching cells such as switching cell 110. The photonic switch 300 comprises 4 plane a switching core where each of the 4 switching planes 302a, 302b, 302c, 302d is provided by a 16×16 blocking switch component. One skilled in the art will appreciate that although an input module of a 1×4 switch is illustrated, the use of a 2×4 or 4×4 switch, where there is only one active input, with the other inputs terminated, is also contemplated. Similarly, at the output, 4×2 and 4×4 switches with outputs that are terminated, and configured so that regardless of the input, only one output is used for signal routing is also contemplated.

Figure 4:
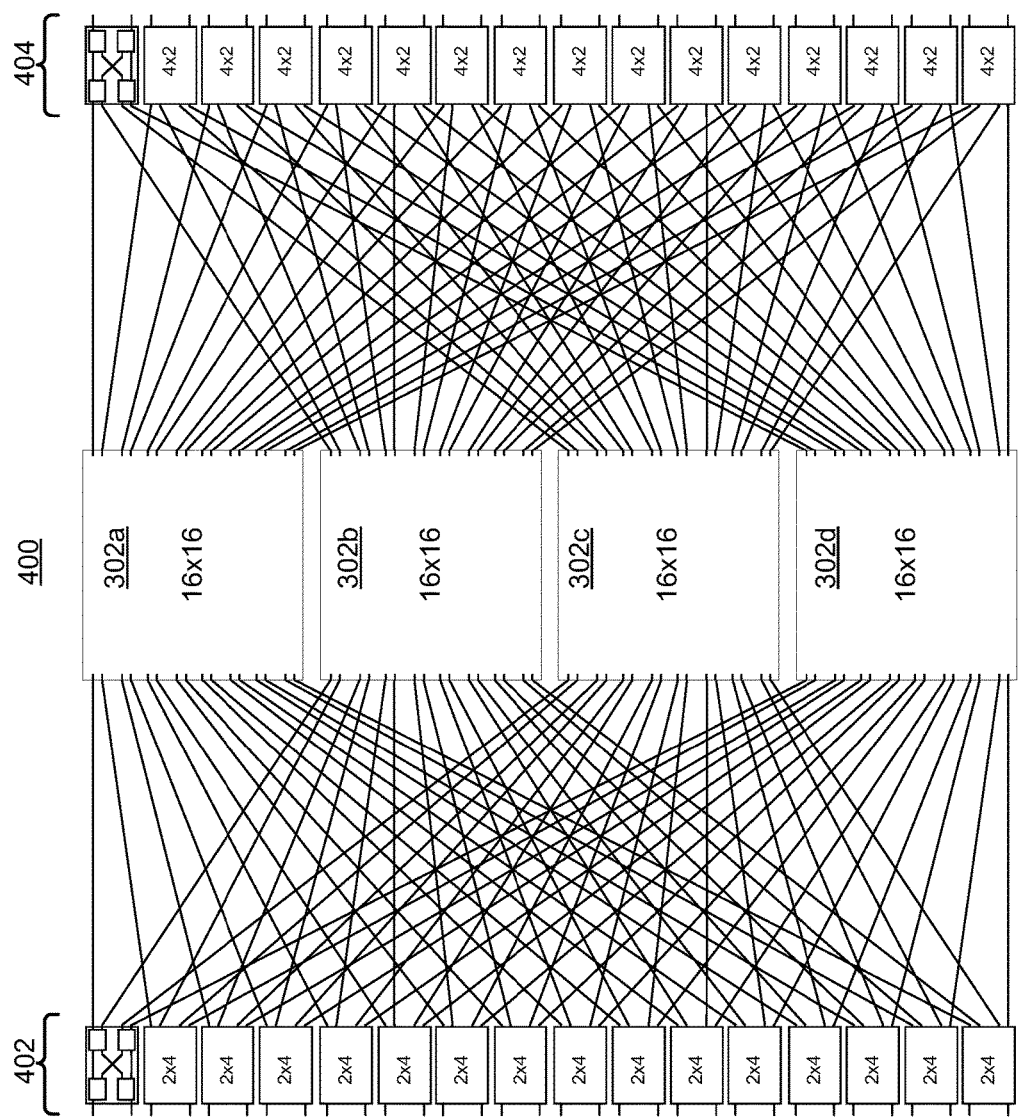
FIG. 4 depicts a further illustrative 32×32 photonic switch built from modular components.

FIG. 4 depicts an illustrative 32×32 photonic switch built from modular components. The photonic switch 400 is similar to the photonic switch 300 and comprises the same switching core of 4 planes of 16×16 blocking switching components 302a, 302b, 302c, 302d. However, as depicted, the input modules of the input section 402 and the output modules of the output section 404 differ from those of the 16×16 switch 300 described above. Rather than comprising a 1×4 switch, the input modules of the input section 402 comprise 2×4 switches. Each input module comprises 4 switching cells for reconfigurably establishing light paths from the 2 switch inputs to each of the 4 switching planes. Similarly, the output modules of the output section 404 comprise 4×2 switches for reconfigurably establishing light paths from each of the 4 switching planes to 2 switch outputs. As depicted, each of the 2×4 input modules and the 4×2 output modules each comprise 4 2×2 switching cells, such as the switching cell 110a described with reference to FIG. 1.

FIG. 5 depicts a further illustrative 64×64 photonic switch built from modular components. The switch 500 comprises the same switching core 302 as the switches 300, 400. Although the switching cores are the same, each of the switches 300, 400, 500 comprise different input sections 304, 404, 504 and different output sections 306, 406, 506. The input section 504 comprises 16 4×4 switches which may each have the same structure as the switch 104. Similarly, the output section 506 comprises 16 4×4 switches which each may have the same structure as the switch 104.

Figure 6:
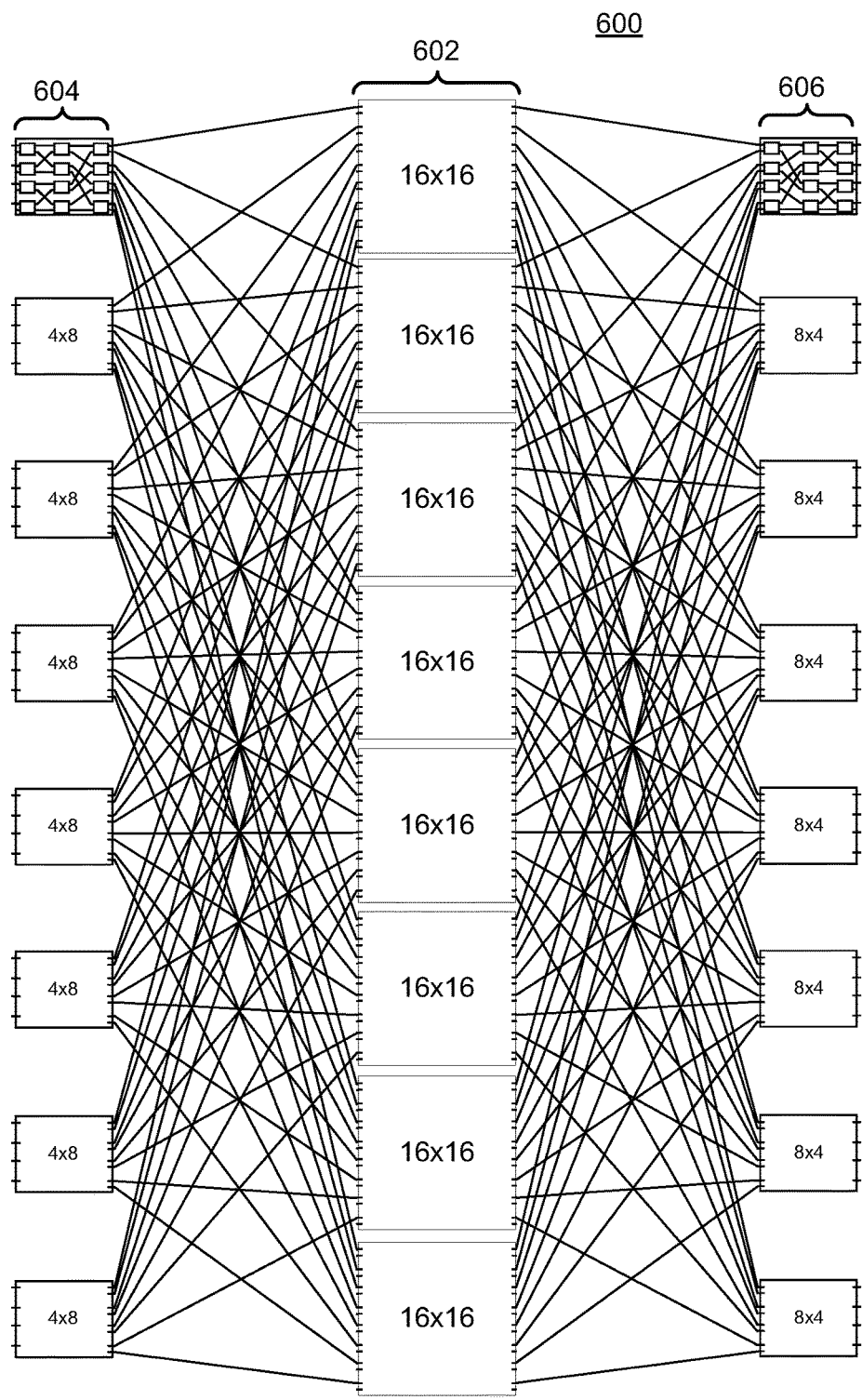
FIG. 6 depicts a further illustrative 32×32 photonic switch built from modular components.

FIG. 6 depicts a further illustrative 32×32 photonic switch built from modular components. The 32×32 photonic switch 600 comprises a different input section, output section as well as switching core than the photonic switches 300, 400 described above; however, the building blocks of the photonic switch 600 are the same as those described above. The photonic switch comprises 8 planes of 16×16 blocking switching components 602 that establish light paths between an input section 604 and output section 606. Each of the 8 planes of 16×16 blocking switching components 602 may be provided by the 16×16 switching component structure 100 described above. The input section 604 comprises 8 input modules, each of the input modules is a 4×8 switch for reconfigurably establishing light paths from the 4 inputs to each of the 8 switching planes 602. As depicted, each of the input modules may comprise 12 2×2 switching cells arranged in 3 columns of 4 switching cells. Each of the switching cells may be provided by the switching cell 110a described above with reference to FIG. 1. Similar to the input section, the output section 606 comprises 8 8×4 switches for reconfigurably establishing light paths from each of the 8 switching planes 602 to 4 switch outputs. Each of the 8 8×4 output switches are provided by 12 2×2 switching cells arranged in 3 columns and 4 rows of 2×2 switching cells.

Figure 7:
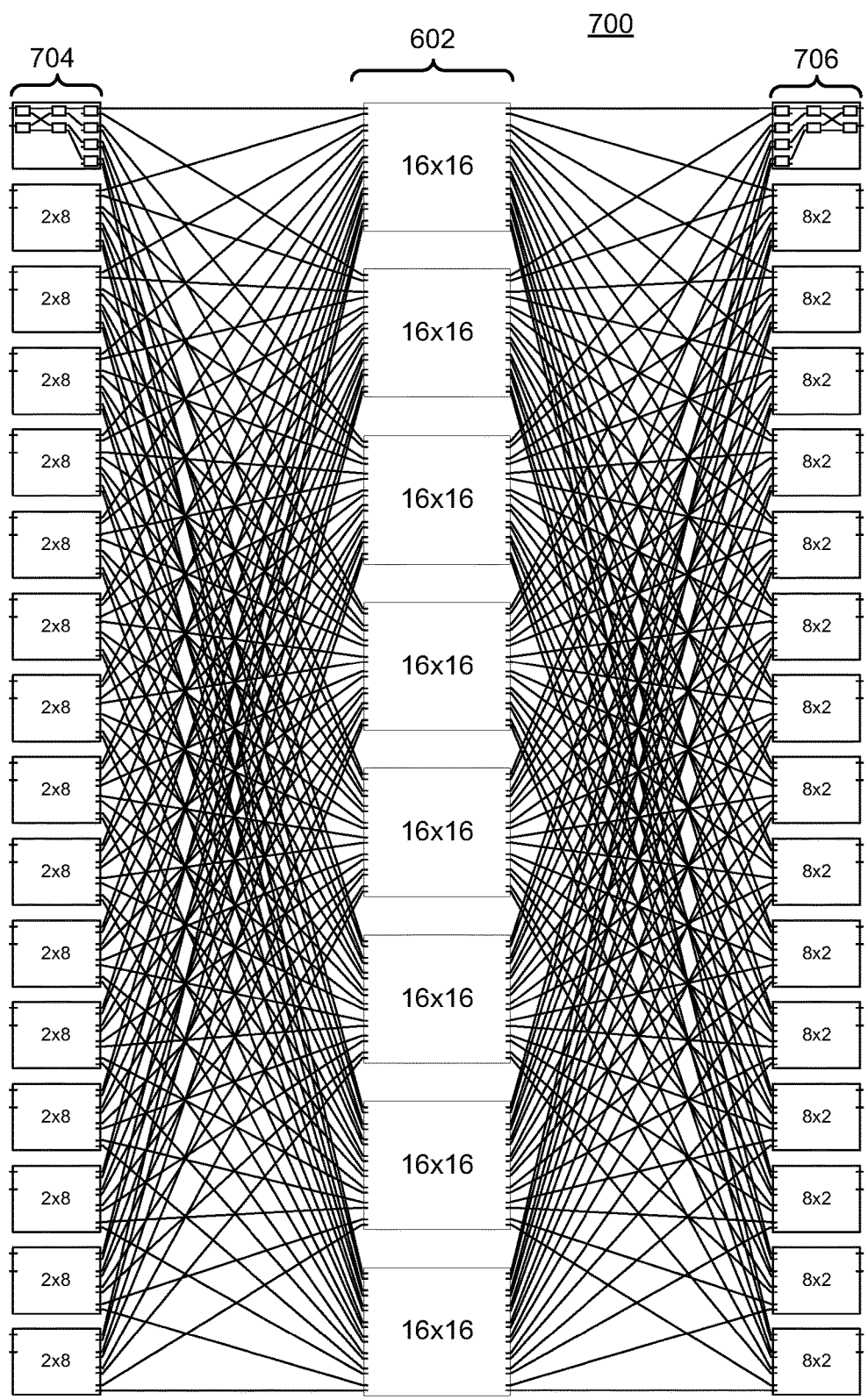
FIG. 7 depicts a further illustrative 32×32 photonic switch built from modular components.

FIG. 7 depicts a further illustrative 32×32 photonic switch built from modular components. The photonic switch 700 is similar to the photonic switch 600 described above; however, the input modules and output modules differ. The photonic switch 700 comprises the same switching core of 8 16×16 switch planes 602. However, in contrast to the photonic switch 600, which comprises 8 4×8 input modules, the photonic switch 700 comprises an input section 704 of 16 2×8 input modules. Each of the input modules reconfigurably establishes light paths from 2 inputs to each of the switch planes. The input modules of the photonic switch 700 each comprise 8 switching cells for reconfigurably establishing light paths from 2 inputs to each of the switch planes. The photonic switch 700 comprises an output section 706 of 16 8×2 output modules, each of which reconfigurably establishes light paths from each of the 8 switching planes to 2 outputs. As with the input modules, the output modules of the photonic switch 700 each comprise 8 switching cells. The photonic switch 700 comprises a higher cell count than the photonic switch 600. The probability of a connection request blocking in the photonic switch 700 is lower than the probability of a connection request blocking in the photonic switch 600 that has a lower switching cell count than the photonic switch 700.

Figure 8:
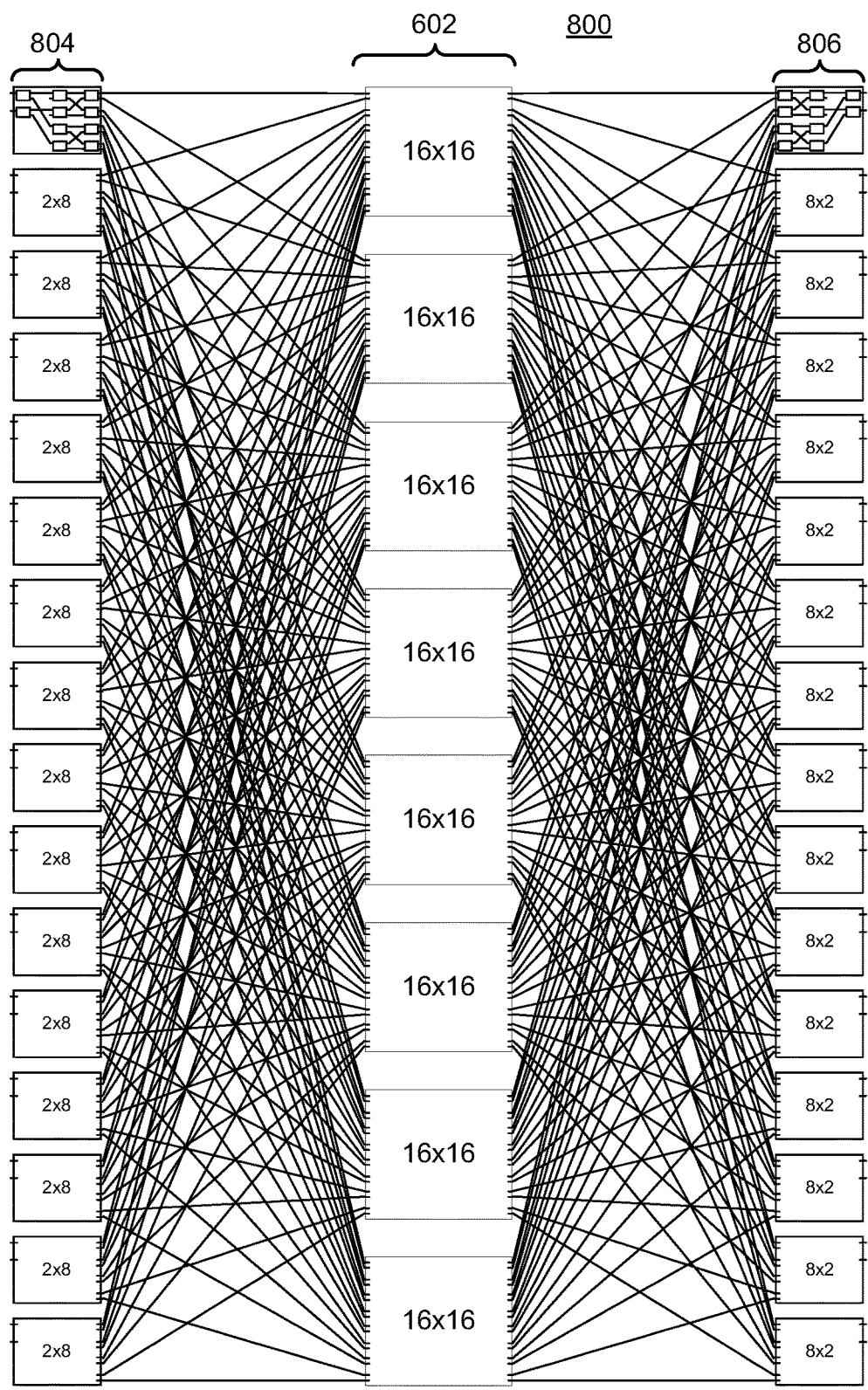
FIG. 8 depicts a further illustrative 32×32 photonic switch built from modular components.

FIG. 8 depicts a further illustrative 32×32 photonic switch built from modular components. The photonic switch 800 is similar to the photonic switches 600 and 700 described above; however, the input modules and output modules differ. The photonic switch 800 comprises the same switching core of 8 16×16 switch planes 602. However, the photonic switch 800 comprises an input section 804 of 16 2×8 input modules. The input modules of the photonic switch 800 each comprise 10 switching cells for reconfigurably establishing light paths from 2 inputs to each of the switch planes. The photonic switch 800 comprises an output section 806 of 16 8×2 output modules that each reconfigurably establish light paths from each of the 8 switching planes to 2 outputs. As with the input modules, the output modules of the photonic switch each comprise 10 switching cells. The photonic switch 800 comprises a higher cell count than both of the photonic switches 600 and 700. The probability of a connection request blocking in the photonic switch 800 is lower than the probability of a connection request blocking in the photonic switches 600 and 700 each of which has a lower switching cell count than the photonic switch 800.

Figure 9:
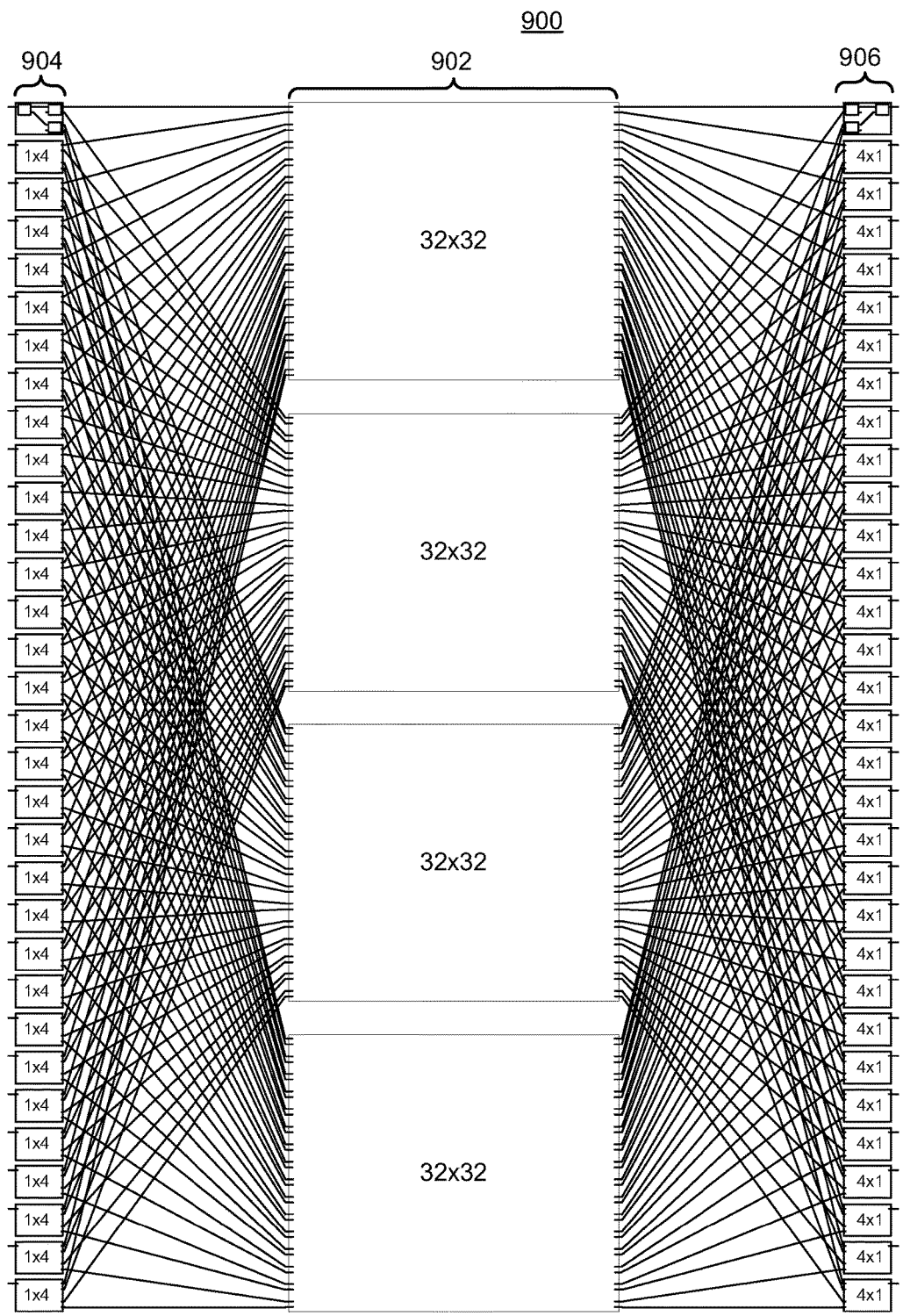
FIG. 9 depicts a further illustrative 32×32 photonic switch built from modular components.

FIG. 9 depicts a further illustrative 32×32 photonic switch built from modular components. The photonic switch 900 comprises a switching core 902 comprising 4 32×32 blocking switch components, such as the blocking switch components described above with reference to FIG. 2. The input section 904 comprises 32 input modules, each comprising a 1×4 switch. The individual input modules correspond to the individual input modules described above with regard to FIG. 3. The output section 906 comprises 32 output modules, each comprising a 4×1 switch. The individual output modules correspond to the individual output modules described above with regard to FIG. 3.

Figure 10:
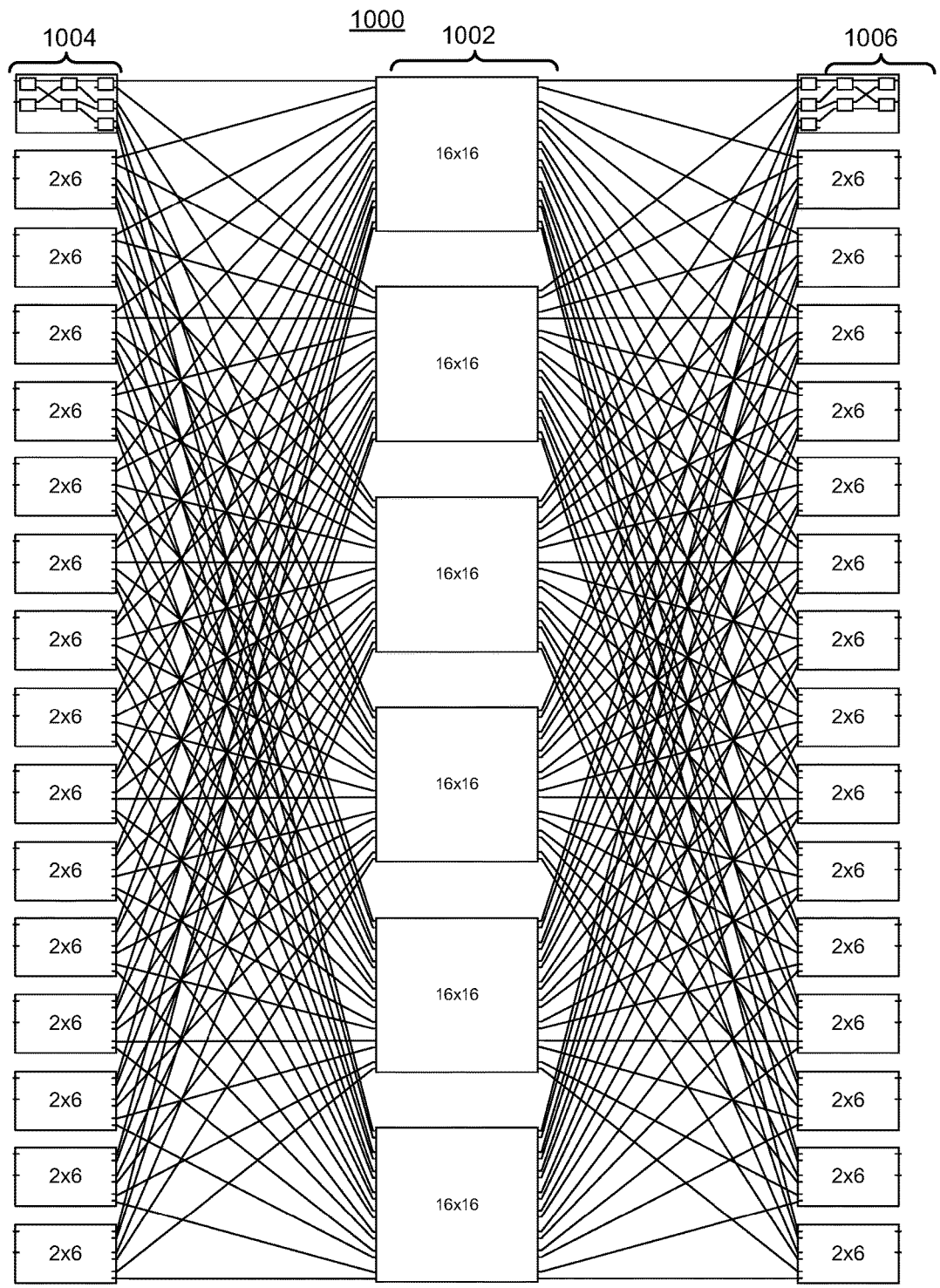
FIG. 10 depicts a further illustrative 32×32 photonic switch built from modular components.

FIG. 10 depicts a further illustrative 32×32 photonic switch built from modular components. The photonic switch 1000 comprises a switching core of 6 16×16 switch planes 1002, with each of the switching planes 1002 provided by a 16×16 blocking switching component. The photonic switch 1000 comprises an input section 1004 of 16 2×6 input modules. Each of the input modules reconfigurably establishes light paths from 2 inputs to each of the 6 switch planes 1002. The input modules of the photonic switch 1000 each comprise 7 switching cells for reconfigurably establishing the light. The photonic switch 1000 comprises an output section 1006 of 16 6×2 output modules that each reconfigurably establish light paths from each of the 6 switching planes 1002 each comprise 7 switching cells.

Figure 11:
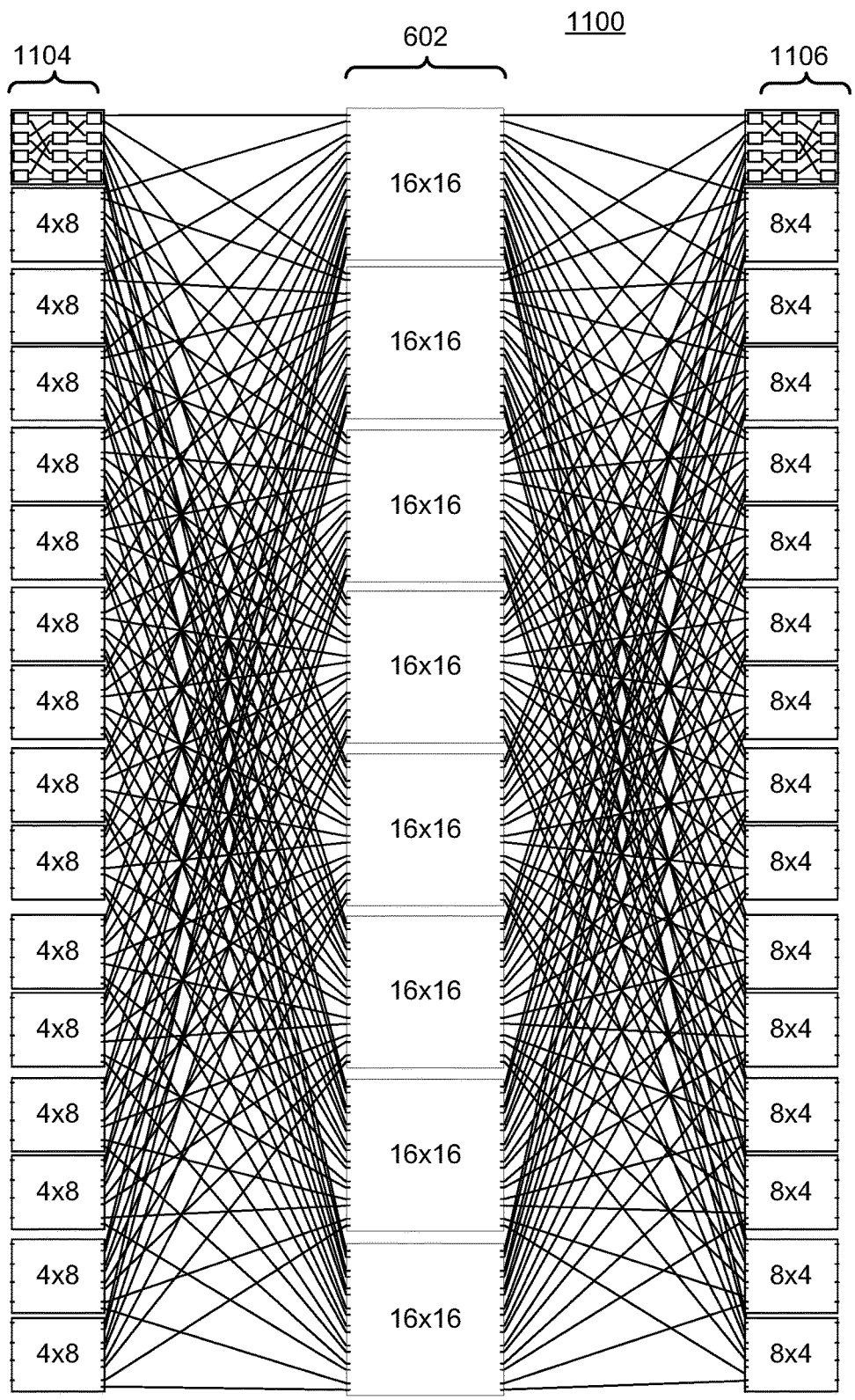
FIG. 11 depicts an illustrative 64×64 photonic switch built from modular components.

FIG. 11 depicts an illustrative 64×64 photonic switch built from modular components. The 64×64 photonic switch 1100 comprises the same switching core 602 of 8 16×16 switching planes as described above with reference to FIGS. 5 and 6. However, as depicted the input sections 1104 and output sections 1106 of the photonic switch 1100 differ from those of photonic switches 600, 700. The input section 1104 comprises 16 input modules each comprising a 4×8 switch of 12 2×2 switching cells similar to the 4×8 input modules described with regard to FIG. 5. The output section 1106 comprises 16 output modules, each comprises an 8×4 switch of 12 2×2 switching cells similar to the 8×4 output modules described above with regard to FIG. 5.

Figure 12:
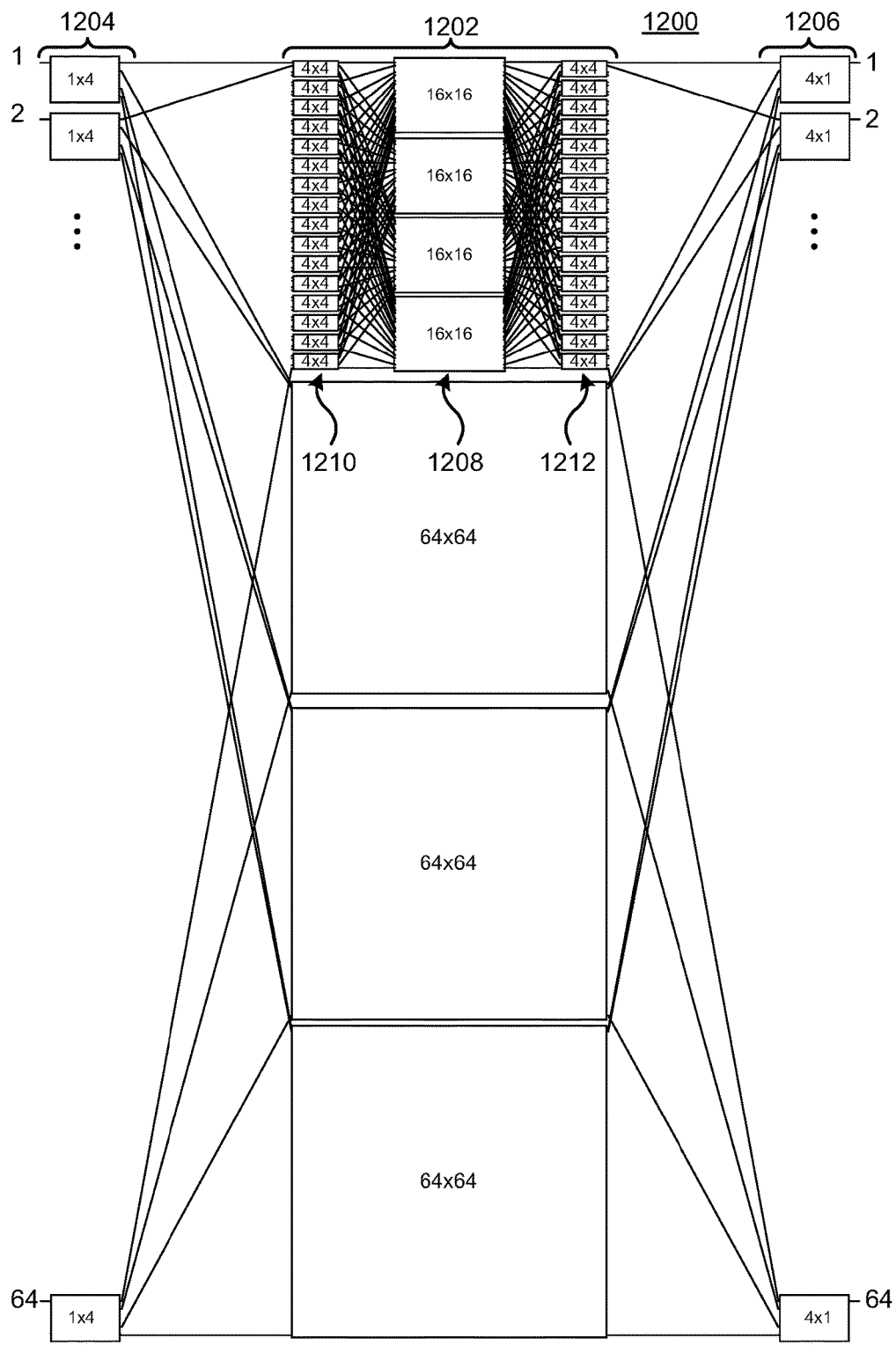
FIG. 12 depicts a further illustrative 64×64 photonic switch built from modular components.

FIG. 12 depicts a further illustrative 64×64 photonic switch built from modular components. The photonic switch 1200 is a 64×64 non-blocking photonic switch. The switch 1200 comprises a switching core 1202 of 4 planes of 64×64 blocking switch components. As depicted, each of the 64×64 blocking planes comprises 4 vertically aligned 16×16 blocking switch components 1208, 16 4×4 component input switches 1210 and 16 4×4 component output switches 1212. The 64×64 blocking planes may alternatively comprise 4 vertically aligned 16×16 blocking switch components 1208 and 2 columns of 16 2×2 switches. The switch 1200 comprises an input section 1204 having 64 input modules, each comprising a 1×4 switches connected to each one of the 64×64 switching planes. Similarly, the switch 1200 comprises an output section 1206 having 64 output modules, each comprising a 4×1 switch connected to each one of the 64×64 switching planes.

Figure 13:
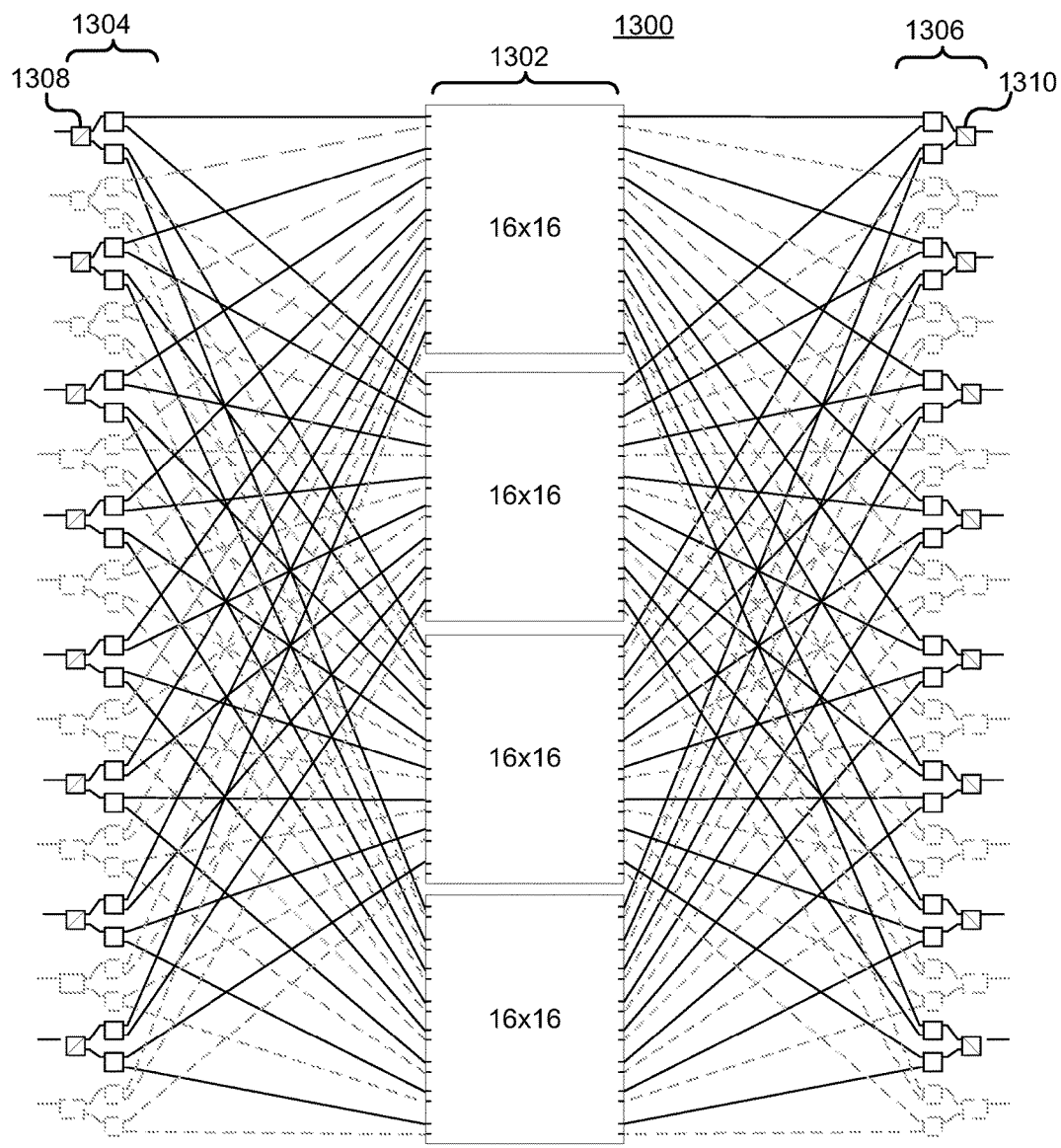
FIG. 13 depicts a dual-polarization 8×8 photonic switch built from modular components.

FIG. 13 depicts a dual-polarization 8×8 photonic switch built from modular components. Silicon based photonics function for a single polarization component, which may be a TE component. A light beam may comprise two orthogonal polarization components, namely a TE component and a TM component. In non-coherent applications, as may be used in datacenter applications as an example, the different polarization components carry the same information. As such, although the light may have different polarization components, the switch only needs to switch one of the polarization components since both components carry the same information. Alternatively, the two polarization components may be rotated to be parallel to each other, adjusted so their respective phases are aligned and subsequently combined into a single beam. However in coherent applications, the different phase components may carry different information, or the information may be carried by the phase differences and as such it is necessary to route both polarization components simultaneously.

FIG. 13 depicts an 8×8 dual-polarization photonic switch 1300. The switch 1300 comprises 4 16×16 blocking switch components 1302 that may be used to simultaneously switch both polarization components of 8 input signals. The photonic switch 1300 is similar to the 16×16 photonic switch 300 described above with reference to FIG. 3. However; the input section 1304 and output section 1306 comprises only 8 input modules and 8 output modules in contrast to 16 input modules and 16 output modules. Each of the 8 input modules includes a polarizing beam splitter and rotator 1308 that splits each of the switch inputs into orthogonal polarization components and rotates one of the polarization components so that both components are parallel and correspond to the polarization that the silicon photonics operate with. Each of the split components is provided to a respective 2×2 switch of the input module. Accordingly, for each input signal, a first polarization component may be switched by two of the 4 16×16 switch blocks and a second polarization component may be switched by the other two of the 4 16×16 blocking switch components. The output section 1306 comprises 9 output modules each comprises two switches for reconfigurably establishing light paths between two 16×16 switching planes to a rotator a combiner 1310. The rotator and combiner rotates the polarization components from one of the switches of the output module and combines it with the polarization component from the second one of the switches of the output module. Accordingly, the switch 1300 can simultaneously split 8 incoming signals into orthogonal polarization components, route each of the 16 individual polarization components and then recombine the routed polarization components at the outputs, to provide the 8 switched output signals. The 8×8 dual-polarization switch 1300 is similar in architecture to the 16×16 switch 300; however half of the input modules and output modules may not be populated as depicted by the grey dashed lines.

The photonic switches described above may provide routing of signals with only a single signal being carried by each of the individual switching cells. Having each switching cell carry a single signal reduces crosstalk. Carrying a single signal per switching cell may be desirable in situations where low cross talk is desirable and the different signals are carried using the same or similar wavelengths. In some applications, each signal being switched may be of a different wavelength and as such crosstalk between the different wavelengths is not a concern. In such situations, it is possible for each of the switching cells to carry two signals instead of only one.

Figure 14:
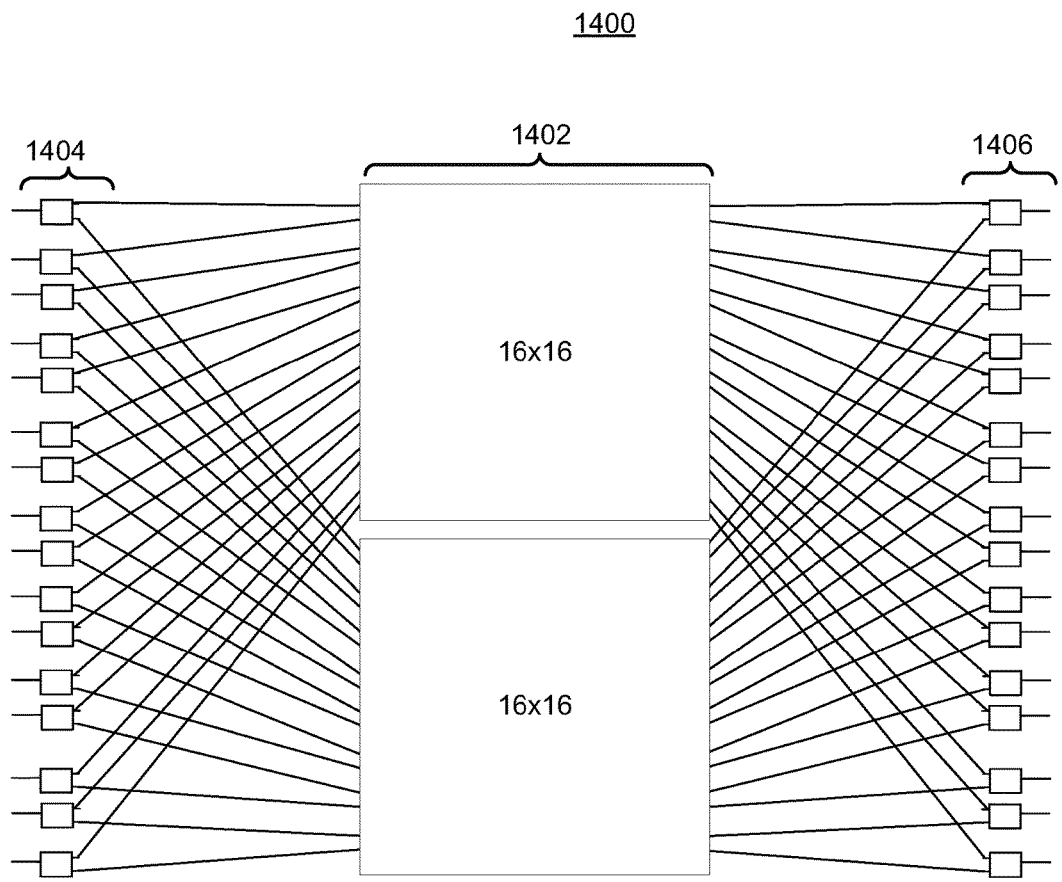
FIG. 14 depicts a further 16×16 photonic switch built from modular components.

FIG. 14 depicts a further 16×16 photonic switch built from modular components. The photonic switch 1400 comprises a switching core 1402 comprising 2 16×16 blocking switch components, such as switching block 100 described above. The switch 1400 comprises an input section 1404 that includes 16 switches for connecting each one of 16 switch inputs to each of the 16×16 switch blocks of the switching core 1402. The switch 1400 further comprises an output section 1406 comprising 16 switches for reconfigurably establishing light paths between an output of each of two the 16×16 blocking switch components to one of 16 switch outputs. If the switch 1400 is allowed to carry two signals per switching cell, the switch 1400 provides similar capacity to the switch 300. The routing of the signals may be done in a similar manner for both switches; however, in switch 300, the signals are routed through the 4 switching planes; whereas the in switch 1400 the signals that would have been switched through the first and third switching plane are switched through the first switching plane. Similarly, the signals that would have been switched through the second and fourth switching plane are switched through the second plane.

Figure 15:
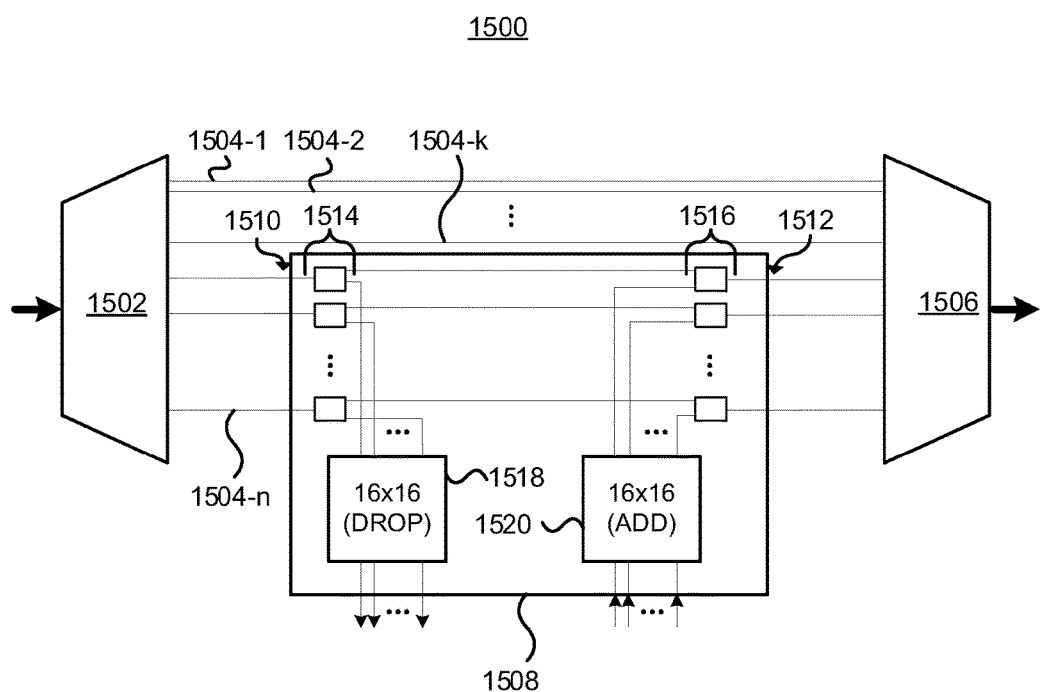
FIG. 15 depicts the add/drop switch of FIG. 14 in an add/drop application.

FIG. 15 depicts add/drop multiplexor using the 16×16 switch of FIG. 14. In various applications, including optical transit networks, a number of different wavelengths may be carried over a single fiber between two or more points. At one or more of the points, wavelength signals can be dropped from the fiber and different wavelength signals added. The adding and dropping of the signals may be done by an add/drop multiplexor 1500. The add/drop multiplexor comprises a demultiplexor 1502 that demultiplexes the wavelengths into the individual wavelengths 1504-1-1504-n. One or more of the wavelengths may be carried straight through from the demultiplexor 1502 to a wavelength multiplexor 1506 that multiplexes the wavelengths onto a single fiber. The add/drop multiplexor 1500 further comprises an add/drop switch 1508 that comprises N transit inputs 1510, N transit outputs 1512. Each of the N transit inputs may be connected to 1×2 input switches 1514, and similarly each of the N transit outputs may be connected to 2×1 output switches 1516. The input switches 1514 are connected to corresponding ones of the output switches 1516 as well as the inputs of a photonic drop switch 1518 such as the switch 1400 described above. Accordingly, each of the N transit input signals can be passed to the N transit output signals or to the switch which can reconfigurably switch each of the N transit inputs to an output of the drop switch 1518. The add/drop switch 1508 may further comprise an add switch 1520 for reconfigurably connecting signals to be added to the N transit output switches 1516. The output from the N transit output switches 1516, which may be either from the add switch or the N transit inputs, as well as the other outputs from the demultiplexor 1512, may be recombined by a multiplexor into a single output comprising the passed-through signals as well as the added signals.

The switch architecture described above comprises a switching section of a plurality of individual switching planes each comprising at least one 16×16 blocking switch component. The switch architecture comprises an input section that comprises a number of different input modules as well as an output section that comprises a number of different output modules. In general, the switching architecture may be built from similar building blocks of a 16×16 blocking switch component. The switching architecture may provide an N×N switch comprising M switching planes and $P_{in}$ input modules and $P_{out}$ output modules. N may be 8, 16, 32, 64, 128, 256, 512 or higher. M may be any integer greater than 2; however multiples and/or powers of 2 or commonly used. $P_{in}$ may be 8, 16, 32 or higher. $P_{out}$ may be 8, 16, 32 or higher. Although not required, $P_{in}$ and $P_{out}$ may be equal. Each of the $P_{in}$ input modules may be provided by an N/P×M switch. Each of the $P_{out}$ output modules may be provided by an M×N/P switch. Although each of the embodiments described above have corresponding input and output modules, that it for example 2×4 input modules and 4×2 output modules, it is possible for the switch to have different types of input modules and output modules. For example, a switch may comprise 2×4 input modules and 4×4 output modules. Further, regardless of the particular size of the switch, it is possible for the switch to have <=2 $\log_2(N)$ switching components for a lightpath.

Although not explicitly depicted in the above figures, the switches may include a controller for determining and generating control signals for controlling each of the switching cells of the switch in order to establish requested connections between the switch's inputs and switch outputs. The controller may route connections with one or two signals per cell. Further, the controller may route connections in a synchronous or asynchronous mode.

The present disclosure provided, for the purposes of explanation, numerous specific embodiments, implementations, examples and details in order to provide a thorough understanding of the invention. It is apparent, however, that the embodiments may be practiced without all of the specific details or with an equivalent arrangement. In other instances, some well-known structures and devices are shown in block diagram form, or omitted, in order to avoid unnecessarily obscuring the embodiments of the invention. The description should in no way be limited to the illustrative implementations, drawings, and techniques illustrated, including the exemplary designs and implementations illustrated and described herein, but may be modified within the scope of the appended claims along with their full scope of equivalents.

While several embodiments have been provided in the present disclosure, it should be understood that the disclosed systems and components might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

What is claimed is:

1. A photonic switch comprising:
  a switching core consisting of first and second switching planes each comprising at least one 16×16 blocking switch component comprising 4 input blocks optically coupled to 4 output blocks, each of the 4 input blocks and the 4 output blocks comprising 2 input 2×2 switching cells optically coupled to 2 output 2×2 switching cells;
  a plurality of input modules, each input module comprising one or more switch inputs optically coupled to each one of the first and second switching planes of the switching core; and
  a plurality of output modules, each output module comprising one or more switch outputs optically coupled to each one of the first and second switching planes of the switching core.

2. The photonic switch of claim 1, wherein the photonic switch is a 16×16 non-blocking photonic switch wherein each one of the first and second switching planes is provided by the 16×16 blocking switch component, the photonic switch comprising:
  16 input modules, each comprising a single switch input optically coupled to each one of the first and second switching planes; and
  16 output modules, each comprising a single switch output optically coupled to each one of the first and second switching planes.

3. The photonic switch of claim 1, wherein the photonic switch is a 32×32 non-blocking photonic switch, wherein each one of the first and second switching planes is a 32×32 blocking switch component comprising:
  a pair of 16×16 blocking switch components;
  16 2×2 fan-in switches optically coupling two switching plane inputs to each one of the pair of 16×16 blocking switch components; and
  16 2×2 fan-out switches optically coupling two switching plane outputs to each one of the pair of 16×16 blocking switch components;
  and wherein the photonic switch comprises:
    32 input modules, each comprising a single switch input optically coupled to each one of the first and second switching planes; and
    32 output modules, each comprising a single switch output optically coupled to each one of the first and second switching planes.

4. The photonic switch of claim 1, wherein the photonic switch is incorporated into an optical add/drop multiplexor.

5. The photonic switch of claim 1, wherein each of the input modules comprises a polarizing beam splitter and rotator for splitting an input into two polarization components, the first polarization component switched through the first switching plane and the second polarization component switched through the second switching plane, and each of the output modules comprises a polarizing beam rotator and combiner for recombining optical signals from the first switching plane and the second switching plane.

6. The photonic switch of claim 1, wherein one or more of the 2×2 switching cells are based on Mach-Zehnder interferometers (MZIs) or micro-ring structures.

7. The photonic switch of claim 1, further comprising a controller for determining and generating control signals in order to establish requested optical paths between the switch inputs and switch outputs.

8. The photonic switch of claim 7, wherein the controller is capable of routing one optical signal per switching cell or two optical signals per switching cell in either a synchronous mode or asynchronous mode.

9. The photonic switch of claim 1, wherein the switch is an N×N switch and each one of the first and second switching planes comprise an N×N blocking switch component comprising $2^k$ 16×16 blocking switch components, where:
  N≥64; and
  k=(N/16)−1, wherein k and N are integers.

10. The photonic switch of claim 1, wherein the switch is an N×N switch and each one of the first and second switching planes comprise an N×N blocking switch component comprising $2^k$ 16×16 blocking switch components, where:
  each of the $2^k$ 16×16 blocking switch component are operated so each of the 2×2 switching cells switches a single signal at a time;
  N≥64; and
  k=N/16, wherein k and N are integers.

11. An N×N photonic switch comprising:
  a switching core comprising M switching planes each comprising at least one 16×16 blocking switch component comprising 4 input blocks optically coupled to 4 output blocks, each of the 4 input blocks and the 4 output blocks comprising 2 input 2×2 switching cells optically coupled to 2 output 2×2 switching cells;
  $P_{in}$ input modules, each input module comprising one or more switch inputs optically coupled to each one of the M switching planes of the switching core; and
  $P_{out}$ output modules, each output module comprising one or more switch outputs optically coupled to each one of the M switching planes of the switching core, where:
  M>4;
  N≥16;
  $P_{in}$≥4; and
  $P_{out}$≥4, wherein M, N, $P_{in}$ and $P_{out}$ are integers.

12. The photonic switch of claim 11, wherein the photonic switch is a 32×32 photonic switch comprising 8 switching planes, each of the switching planes comprising a single 16×16 blocking switch component.

13. The photonic switch of claim 12, comprising:
  8 input modules, each for reconfigurably establishing light paths from 4 switch inputs to each of the 8 switching planes through 12 2×2 switching cells; and
  8 output modules, each for reconfigurably establishing light paths from 4 switch outputs to each of the 8 switching planes through 12 2×2 switching cells.

14. The photonic switch of claim 13, comprising:
  16 input modules, each for reconfigurably establishing light paths from 2 switch inputs to each of the 8 switching planes through 8 2×2 switching cells; and
  16 output modules, each for reconfigurably establishing light paths from 2 switch outputs to each of the 8 switching planes through 8 2×2 switching cells.

15. The photonic switch of claim 11, wherein the photonic switch is a 64×64 photonic switch comprising:
  8 switching planes;
  16 input modules, each comprising 4 switch inputs reconfigurably connected to each of the 8 switching planes through 12 2×2 switching cells; and
  16 output modules, each comprising 4 switch outputs reconfigurably connected to each of the 8 switching planes through 12 2×2 switching cells.

16. The photonic switch of claim 11, wherein each of the switching planes is a 32×32 blocking switch comprising:

a pair of 16×16 switches;
16 2×2 fan-in switches reconfigurably connecting 2 switching plane inputs to each one of the pair of 16×16 switches; and
16 2×2 fan-out switches reconfigurably connecting 2 switching plane outputs to each one of the pair of 16×16 switches.

17. The photonic switch of claim 11, wherein the photonic switch is a 64×64 photonic switch comprising:
8 switching planes;
32 input modules, each comprising 2 switch inputs reconfigurably connected to each of the 8 switching planes through 8 2×2 switching cells; and
32 output modules, each comprising 2 switch outputs reconfigurably connected to each of the 8 switching planes through 8 2×2 switching cells.

18. The photonic switch of claim 11, wherein each of the switching planes is a 64×64 blocking switch components comprising 4 planes of 16×16 switches, 16 4×4 input switches and 16 4×4 output switches.

19. The photonic switch of claim 11, wherein one or more of the 2×2 switching cells are based on Mach-Zehnder interferometers (MZIs) or micro-ring structures.

20. The photonic switch of claim 11, further comprising a controller for determining and generating control signals in order to establish requested connections between the switch inputs and switch outputs.

21. The photonic switch of claim 20, wherein the controller is capable of routing one optical signal per switching cell or two optical signals per switching cell in either a synchronous mode or asynchronous mode.

22. An N×N photonic switch comprising:
a switching core comprising 4 switching planes each comprising at least 4 16×16 blocking switch components, 16 4×4 input switches and 16 4×4 output switches, each of the at least 4 16×16 blocking switch components comprising 4 input blocks optically coupled to 4 output blocks, each of the 4 input blocks and the 4 output blocks comprising 2 input 2×2 switching cells optically coupled to 2 output 2×2 switching cells;
$P_{in}$ input modules, each input module comprising one or more switch inputs optically coupled to each one of the 4 switching planes of the switching core; and
$P_{out}$ output modules, each output module comprising one or more switch outputs optically coupled to each one of the 4 switching planes of the switching core, where:
N≥32;
$P_{in}$≥4; and
$P_{out}$≥4, wherein M, N, $P_{in}$ and $P_{out}$ are integers.

23. The photonic switch of claim 22, wherein each of the switching planes is a 64×64 blocking switch components comprising 4 planes of 16×16 switches, 16 4×4 input switches and 16 4×4 output switches.

24. The photonic switch of claim 22, wherein one or more of the 2×2 switching cells are based on Mach-Zehnder interferometers (MZIs) or micro-ring structures.

25. The photonic switch of claim 22, further comprising a controller for determining and generating control signals in order to establish requested connections between the switch inputs and switch outputs.

26. The photonic switch of claim 25, wherein the controller is capable of routing one optical signal per switching cell or two optical signals per switching cell in either a synchronous mode or asynchronous mode.

* * * * *